United States Patent Office 3,549,693
Patented Dec. 22, 1970

3,549,693
PROCESS FOR PRODUCING ACETOACETIC
ACID ESTERS
Herbert Eck and Hellmuth Spes, Burghausen, Upper Bavaria, Germany, assignors to Wacker - Chemie G.m.b.H., Munich, Bavaria, Germany, a corporation of Germany
No Drawing. Filed Jan. 3, 1968, Ser. No. 695,343
Claims priority, application Germany, Jan. 10, 1967, W 43,137
Int. Cl. C07c 69/72
U.S. Cl. 260—483                3 Claims

ABSTRACT OF THE DISCLOSURE

This invention relates to producing acetoacetic acid esters, and it provides a novel and improved process for accomplishing this purpose by reacting diketene with an alcohol, particularly an aliphatic alcohol, which contains a catalyst in dissolved form, at a temperature between the boiling point of the alcohol and the boiling point of the acetoacetic acid ester formed, and it is characterized by the fact that the catalyst is an alkali metal salt of an acid with a pK value below 3.0.

BACKGROUND OF THE INVENTION

The conversion of diketene with alcohols into acetoacetic acid esters is known.

In the usual methods, alkaline or acid catalysts are used. Since diketene is an extremely reactive compound, a series of side reactions is possible which are promoted by acid as well as alkaline catalysts.

As alkaline catalysts one uses, for instance, tertiary amines like triethylamine and pyridine, also sodium acetate, sodium stearate, sodium silicate, borax and sodium methylate. These lead to secondary products of which the most important are the O-acetyl- and C-acetyl-acetoacetic esters.

Moreover, the acetoacetic ester is acylated by the diketene. Thereby higher resin products are created by condensation and polymerization reactions, and these can no longer be separated by distilling and remain as a brown-black residue in the still.

However, if one works with acid catalysts like e.g. sulphuric acid or sulfonic acid, the most important secondary product obtained is β-alkoxycrotonic acid ester. Compared to the by-products described above, this has the additional drawback that it cannot be separated economically from acetoacetic ester.

SUMMARY OF THE INVENTION

We have now discovered a process for producing acetoacetic acid esters by conversion of diketene with alcohols, particularly aliphatic alcohols, which contain the catalyst in dissolved form, and we work at temperatures between the boiling point of the alcohol used and the boiling point of the acetoacetic ester formed, at normal pressure or at elevated pressure. The process is characterized by the fact that for catalysts we use alkali metal salts of acids with a pK value below 3.0, singly or in mixture.

Suitable catalysts are for instance alkali metal halides and/or alkali metal sulfates, e.g. sodium chloride, sodium bromide and sodium sulfate, but also alkali metal salts of α-chlorinated carboxylic acids, e.g. sodium α-chloroacetic acid or potassium α-chloroacetic acid as well as sulfonic acid salts can be used successfully.

Suitable alcohols are in particular aliphatic alcohols like for instance methanol, ethanol, butanol, 2-ethyl hexanol. The alcohol component is preferably used in slight excess which usually amounts to less than 15%.

The reaction heat is sufficient to maintain the reaction temperature and, if necessary, for distilling off the easily volatile components like acetone, alcohol, acetic acid and acetic esters.

It was in no way to be expected that the addition of alcohols to diketene can be catalyzed by the practically neutral salts, according to our invention.

DESCRIPTION OF THE PREFERRED EMBODIMENTS

In the discontinuous work method the process was carried out as follows:

Into a 1-liter flask equipped with a reflux condenser, drip funnel and stirrer, the alcohol and the catalyst were placed, heated to the boiling point and mixed, drop by drop, while stirring, in the course of eight hours with 94% of the quantity of diketene computed for the alcohol. After adding the diketene, the reaction mixture was heated for an additional 45 minutes, and after 16 hours it was fractionated in a vacuum. The raw diketene used consisted of 84.5% diketene, 5.5% acetic acid anhydride and 9.5% residue.

COMPARATIVE EXAMPLE A

In accordance with the method described above, a methanolic solution of sodium acetate (0.5 g./l.) is reacted with diketene. At the end of the diketene input flow the temperature in the flask rose to 102° C. The reaction mixture was fractionated in a water jet vacuum. The yield of acetoacetic acid methyl ester, referred to the diketene used, amounted to 95.1%.

An increase of the quantity of sodium acetate to 1.0 g./l. results in a reduction of the yield. $Sp_{12}=60°$ C.

EXAMPLE 1

During an analogous conversion with diketene with a methanolic solution of sodium chloracetate (1 g./l.) the temperature in the flask increased to 120° C. at the end of the reaction. The yield of acetoacetic acid methyl ester was 97.63% referred to the diketene used.

COMPARATIVE EXAMPLE B

In accordance with the method described above, an ethanolic solution of sodium acetate (0.3 g./l.) was converted with diketene. The final temperature in the flask was 137° C. The yield of acetoacetic acid ethyl ester, after fractional distillation in the water jet vacuum, referred to the diketene used, was 92.41%. $Sp_{12.5}=71°$ C.

EXAMPLE 2

During a corresponding conversion of diketene with an ethanolic solution of sodium chloracetate (0.25 g./l.) the temperature rose to 132° C. at the end of the reaction. The yield of acetoacetic acid ethyl ester, referred to the diketene used, was 94.5%.

EXAMPLE 3

During the analogous conversion with diketene with an ethanolic potassium chloracetate solution (1.5 g./l.) the yield was 94.1% of acetoacetic acid ethyl ester, referred to the diketene used. The temperature at the end of the reaction was 132° C.

EXAMPLE 4

The above reaction could also be catalyzed by a mixture of sodium chloride, sodium bromide and sodium sulfate (0.4 g./l. each). The temperature at the end of the input of diketene was 108° C. The yield of acetoacetic acid ethyl ester, referred to the diketene used, was 95.4%.

EXAMPLE 5

For the continuous tests, the following method was used:

The alcohol-catalyst-diketene mixture (each time 100 ml. of raw diketene and 7 ml. ethanol were mixed in advance) was pumped into a 2-liter flask (overflow at 1000 ml.) by means of a Normados dosaging pump. Since the reaction heat in this equipment was not quite sufficient, the reaction temperature was kept at 135 to 140° C. by means of an electric heater. The test results so obtained are set forth in the table below:

TABLE 1

| g./l. catalyst | Staying period hours | Yield of acetoacetic* acid ethyl ester (percent) | Formation of residue (percent of theory) | O- and C- acetoacetic acid ethyl ester (percent) |
|---|---|---|---|---|
| 0.3 sodium acetate (comp. exam) | 3.5 | 93.44 | 11.5 | 2.3 |
| 0.3 sodium chloracetate | 3.5 | 95.68 | 0 | 0.62 |
| 0.6 sodium chloracetate | 3.5 | 96.70 | 3.9 | 1.5 |

*Referred to the diketene used.

EXAMPLE 6

When carrying out the process on a production scale, in the case of acetoacetic acid methyl ester the yield was improved from 90% (Na-acetate as catalyst) to 96% (Na-chloracetate) under otherwise identical conditions.

The invention claimed is:

1. Process for producing acetoacetic acid esters which comprises reacting diketene with an aliphatic alcohol having 1 to 8 carbon atoms containing a catalyst in dissolved form, at a temperature between the boiling point of the alcohol used and the boiling point of the acetoacetic acid ester formed, said catalyst being an alkali metal salt of an acid with a pK value below 3.0.

2. Process according to claim 1, in which the catalyst is selected from the group consisting of alkali metal halides and alkali metal sulfates.

3. Process according to claim 1, in which the catalyst is an alkali metal salt of a α-chlorinated carboxylic acid.

References Cited

UNITED STATES PATENTS 3,445,509  5/1969  Probst et al. _____ 260—479

LORRAINE A. WEINBERGER, Primary Examiner

V. GARNER, Assistant Examiner